(12) United States Patent
Gupta et al.

(10) Patent No.: US 6,988,096 B2
(45) Date of Patent: Jan. 17, 2006

(54) ADAPTIVE CONTENT DELIVERY SYSTEM AND METHOD

(75) Inventors: Sunil Gupta, Miami, FL (US); Kevin Hrim, Sunrise, FL (US); David Cole, Pembroke Pines, FL (US)

(73) Assignee: LearningSoft Corporation, Miami, FL (US)

( * ) Notice: Subject to any disclaimer, the term of this patent is extended or adjusted under 35 U.S.C. 154(b) by 486 days.

(21) Appl. No.: 09/908,048

(22) Filed: Jul. 18, 2001

(65) Prior Publication Data

US 2002/0032708 A1 Mar. 14, 2002

Related U.S. Application Data

(60) Provisional application No. 60/219,094, filed on Jul. 18, 2000, and provisional application No. 60/246,131, filed on Nov. 6, 2000.

(51) Int. Cl.
G06F 17/30 (2006.01)

(52) U.S. Cl. .............................. 707/3; 707/10; 707/103; 707/103 Y; 707/104.1

(58) Field of Classification Search .................. 707/10, 707/4, 6, 103 Y, 103, 104.1, 3, 1; 434/350, 434/323, 362; 273/432; 706/927
See application file for complete search history.

(56) References Cited

U.S. PATENT DOCUMENTS

| | | | |
|---|---|---|---|
| 5,261,823 A | | 11/1993 | Kurokawa |
| 5,537,618 A | | 7/1996 | Boulton et al. ............. 395/161 |
| 5,820,386 A | * | 10/1998 | Sheppard, II ................ 434/322 |
| 5,864,869 A | | 1/1999 | Doak et al. .................. 707/104 |
| 5,934,909 A | | 8/1999 | Ho et al. |
| 5,991,741 A | * | 11/1999 | Speakman et al. ............. 705/30 |
| 6,000,945 A | | 12/1999 | Sanchez-Lazer et al. |
| 6,024,577 A | * | 2/2000 | Wadahama et al. ......... 434/322 |
| 6,029,043 A | | 2/2000 | Ho et al. |
| 6,102,406 A | | 8/2000 | Miles et al. |
| 6,112,049 A | * | 8/2000 | Sonnenfeld .................. 434/350 |
| 6,175,841 B1 | * | 1/2001 | Loiacono ..................... 715/512 |
| 6,181,910 B1 | * | 1/2001 | Jerrold-Jones et al. ...... 434/353 |
| 6,418,298 B1 | * | 7/2002 | Sonnenfeld .................. 434/350 |
| 2003/0017442 A1 | * | 1/2003 | Tudor et al. ................. 434/322 |

OTHER PUBLICATIONS

Carswell et al. "An Adventure Game Approach to Multimedia Distance Education" ACM Conference on Integrating Technology into Comp. Sci. Ed. pp. 122–124 (1996).

Castellanos et al. "Hypermedia Method to Teach Concepts of Colour Through Art" ACM Multimedia 94 pp. 321–327 (1994).

McCormick, "Using A Model Railroad To Teach Digital Process Control" ACM pp. 304–308 (1988).

(Continued)

*Primary Examiner*—Jean M. Corrielus
(74) *Attorney, Agent, or Firm*—McKenna Long & Aldridge LLP.

(57) ABSTRACT

The present invention relates to delivering adaptive content to a user via a user output device, typically a computer. In general, user information associated with a particular user is retrieved and activity selection and topic selection information are received. A set of one or more questions is retrieved based upon the selected topic and the user information. The retrieved question set is presented to the user in the context of interacting with the selected activity. Progression through the selected activity results from successfully answering the questions. In some instances, questions may be evaluated for bias with respect to particular user group(s). Further, certain embodiments may support assignment of particular topics, questions and/or activities to particular users or user groups. Facilities may also be supported for aiding users in developing and/or expanding the available questions, topics and/ or activities.

37 Claims, 7 Drawing Sheets

OTHER PUBLICATIONS

McCormick, "Using A Model Railroad To Teach ADA and Software Engineering" ACM pp. 511–514 (1991).

Moser, "A Fantasy Adventure Game as a Learning Enviroment: Why Learning to Program is so Difficult and What Can Be Done About It" ACM Conference on Integrating Technology into Comp. Sci. Ed. pp. 114–116 (1997).

Shifroni et al. "Simulation Game for Teaching Communication Protocols" ACM SIGCSE '97 pp. 184–188 (1997).

Spool et al. "Using a Game to Teach a Design Process" ACM CHI 94 Companion pp. 117–118 (1994).

* cited by examiner

ADAPTIVE CONTENT DELIVERY SYSTEM AND METHOD

CROSS-REFERENCE TO RELATED PATENT APPLICATION

This application claims the benefit, pursuant to 35 U.S.C. §119(e), of applicants' provisional U.S. Patent Applications Ser. No. 60/219,094, filed Jul. 18, 2000, entitled "ADAPTIVE CONTENT DELIVERY SYSTEM AND METHOD" and Ser. No. 60/246,131, filed Nov. 6, 2000, entitled "ADAPTIVE CONTENT DELIVERY SYSTEM AND METHOD", which are both hereby incorporated by reference herein for all purposes.

BACKGROUND OF INVENTION

1. Field of Invention

The present invention is directed to systems and methods for creating, managing and delivering adaptive content. More specifically, without limitation, the present invention relates to systems and methods for creating, managing and delivering educational curricular materials adapted according to defined objectives and performance metrics.

2. Description of Related Art

The Internet is a global network of connected computer networks. Over the last several years, the Internet has grown in significant measure. A large number of computers on the Internet provide information in various forms. Anyone with a computer connected to the Internet can potentially tap into this vast pool of information.

The most wide spread method of providing information over the Internet is via the World Wide Web (the Web). The Web consists of a subset of the computers connected to the Internet; the computers in this subset run Hypertext Transfer Protocol (HTTP) servers (Web servers). The information available via the Internet also encompasses information available via other types of information servers such as GOPHER, WAIS, SMTP (simple mail transfer protocol), POP3 (Post Office Protocol) and FTP (file transfer protocol).

Information on the Internet can be accessed through the use of a Uniform Resource Locator (URL). A URL uniquely specifies the location of a particular piece of information on the Internet. A URL will typically be composed of several components. The first component typically designates the protocol by which the address piece of information is accessed (e.g., HTTP, GOPHER, etc.). This first component is separated from the remainder of the URL by a colon (':'). The remainder of the URL will depend upon the protocol component. Typically, the remainder designates a computer on the Internet by name, or by IP number, as well as a more specific designation of the location of the resource on the designated computer. For instance, a typical URL for an HTTP resource might be:

http://www.server.com/dir1/dir2/resource.htm where http is the protocol, www.server.com is the designated computer and /dir1/dir2/resouce.htm designates the location of the resource on the designated computer.

Web servers host information in the form of Web pages; collectively the server and the information hosted are referred to as a Web site. A significant number of Web pages are encoded using the Hypertext Markup Language (HTML) although other encodings using the eXtensible Markup Language (XML) or the Standard Generic Markup Language (SGML) are becoming increasingly more common. The published specifications for these languages are incorporated by reference herein. Web pages in these formatting languages may include links to other Web pages on the same Web site or another. As will be known to those skilled in the art, Web pages may be generated dynamically by a server by integrating a variety of elements into a formatted page prior to transmission to a Web client. Web servers, and information servers of other types, await requests for the information from Internet clients.

Client software has evolved that allows users of computers connected to the Internet to access this information. Advanced clients such as Netscape's Navigator and Microsoft's Internet Explorer allow users to access software provided via a variety of information servers in a unified client environment. Typically, such client software is referred to as browser software.

Computer and telecommunications technologies provide an unprecedented ability to custom tailor content to the demands of particular users. The present invention utilizes these technologies to create, manage and deliver content, particularly educational curricular materials, adapted according to defined objectives and performance metrics. Further, usage of the adapted material by a diverse user based allows evaluation of the material to determine potential content bias.

Most current electronic educational environments provide a scripted package of materials to students that do not take into account the individual needs or understanding of the student. Further, such environments do not typically take into account the limitations of the delivery environment used by the student. When a user first subscribes to an environment according to the present invention, she begins at a basic education level and works her way up so she is not intimidated by her first interaction. The questions are prepared with different ascending levels of difficulty for each age and grade of the user to offer a unique and satisfying experience. The environment consists of a dynamic system of evaluations that measure the user's progress based on age, academic level and number of correctly answered questions and advances by way of well structured, interactive, positive experiences. If a user has difficulty responding to some questions or finds the material too easy, the environment will adapt to the user's knowledge level. Users have the opportunity to learn new concepts and to practice and reinforce those concepts from the curriculum. Also, parents/teachers have the option to receive periodic reports to follow a user's progress and participation.

SUMMARY OF THE INVENTION

The present invention is directed to an environment for providing adaptive content to a user via a user output device, typically a computer, where the adaptation is based upon characteristics of the particular user and/or the particular user's output device. More specifically, the content delivered is curricular materials in the form of questions provided via an activity-based presentation environment where users progress through the activity by answering presented questions.

The present adaptive content delivery processes and systems are targeted at delivering a curriculum based testing system. The adaptive content delivery according to the present invention uses a question and answer format to evaluate progress through a curriculum. Based on objectives and performance metrics content is tailored and delivered. The localization features such as language and country customization may further enhance this adaptation in some embodiments.

A typical environment according to the present invention includes a system data store, a system processor and a link to a communication channel allowing communication with one or more user output devices. The system data store stores data needed to provide the adaptive content and may include activity information, topic information, question information and user information. The system data store may include multiple physical and/or logical data stores for storing the various types of information. Data storage and retrieval functionality may be provided by either the system processor or data storage processors associated with the data store. The system processor is in communication with the system data store via any suitable communication channel(s); the system processor is in communication with the link via the same, or differing, communication channel(s). The system processor will typically include one or more processing elements that provide access, curriculum and/or other functionality.

The curriculum functionality according to the present invention may include delivery of content adapted based upon filtering constraints (characteristics) of particular users and/or output devices associated with them, curriculum evaluation, curriculum development and/or curriculum assignment. Such functionality is exhibited by various embodiments of the present invention.

Accordingly, a method of delivering adaptive content typically includes a variety of steps that may, in certain embodiments, be executed by the typical environment summarized above and more fully described below or be stored as computer executable instructions in and/or on any suitable combination of computer-readable media. In some embodiments, user information associated with a particular user is retrieved and activity selection and topic selection information are received. A set of one or more questions is retrieved based upon the selected topic and the user information. The retrieved question set is presented to the user in the context of interacting with the selected activity. Various performance metrics are recorded during user interaction. Some examples of these metrics are number of attempts to answer a question, whether the question was answered correctly, and reaction time between being presented the question and when the question was answered. Progression through the selected activity can be tied to evaluation of performance metrics.

Further, some embodiments may include facilities supporting creation and management of constraints for the adaptation of the content. In such embodiments, learning objectives can be represented and captured, in conjunction with the definitions necessary for the evaluation engine. These objectives can be modeled as a sequence, collective, or system based curriculum. This tight integration between the curriculum development and the integral evaluation criteria complete and complement this process automation. The loop is closed by automated analysis and application of a rule base to distill the user interaction and reincorporate the results into the system.

The technology according to the present invention supports the evaluation of user performance when working through a curriculum set in a specified manner. A curriculum structure and a method for capturing user performance data are defined. Taking advantage of the structure and artifacts generated through the content usage, it is possible to invert the evaluation process and judge the curriculum structure based upon the user performance data. In some embodiments, therefore, curriculum may be analyzed for a variety of potential bias problems based upon such criteria as age, gender, language, race, etc.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention.

DETAILED DESCRIPTION OF THE INVENTION

Figure 1:
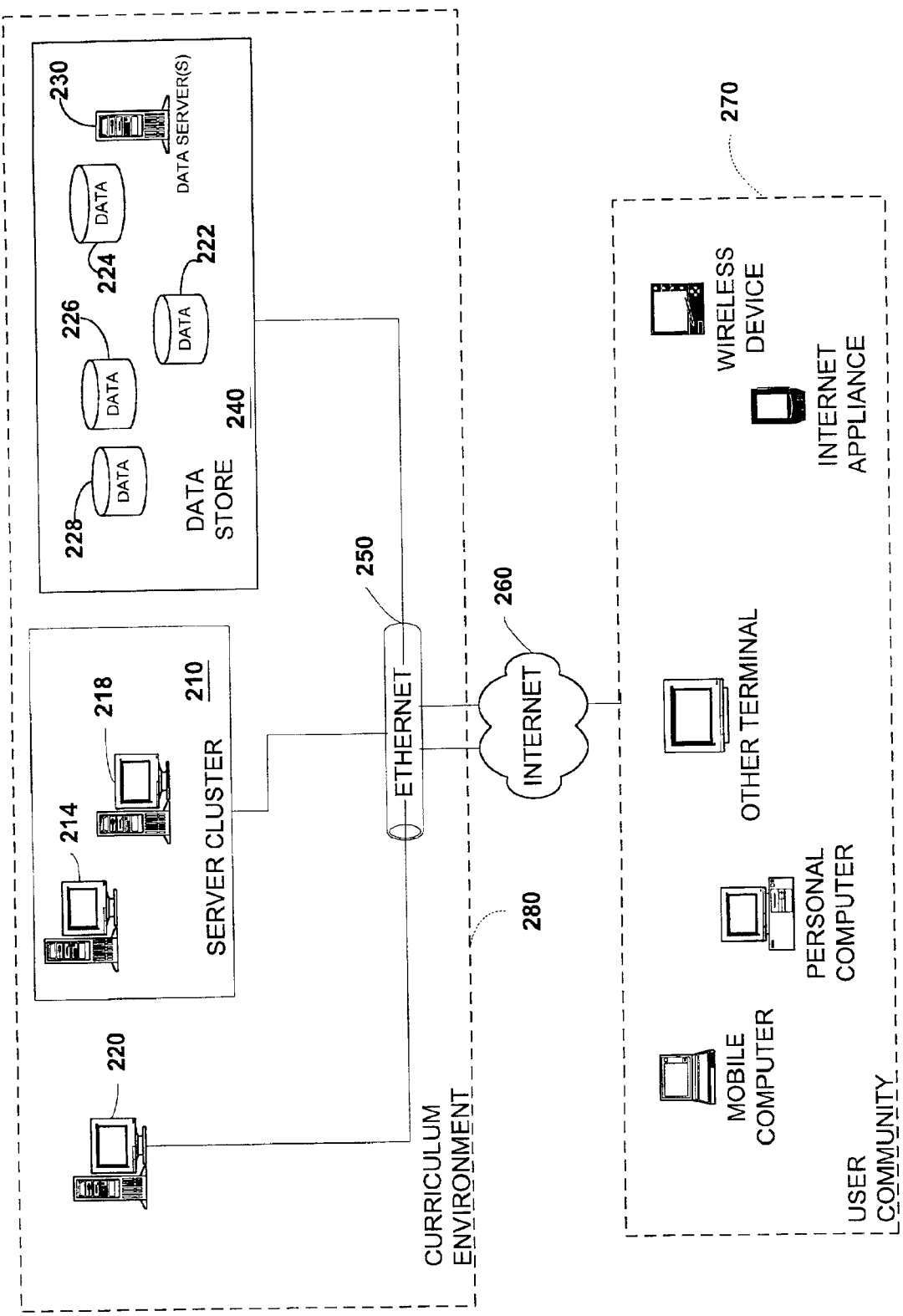
FIG. 1 is a diagram of an architecture for a typical system according to the present invention.

A preferred embodiment of the invention is now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Architecture of a Typical Environment

FIG. 1 depicts a typical environment according to the present invention. Members of the user community using suitable devices 270 can interact with the curriculum environment 280 via a communications channel such as the Internet 260. A typical curriculum environment 280 will include a cluster of servers 210 including one or more servers 214, 218 supporting various curriculum functionality which, in some embodiments, may include delivery, evaluation, development and assignment, as described more fully below. The curriculum environment may include a separate system data store 240 for storing data associated with curriculum (questions, answers, etc.), topics, activities and users. A data store, in a typical embodiment, may be implemented as a database system using one or more servers 230 with one or more internal or external data repository 240, as described more fully below. The curriculum environment 280 will also typically include a communication channel such as Ethernet 250 supporting communication among components of the environment 280. The curriculum environment 280 may also optionally include one or more load-balancing servers 220 for distributing work among the components of the environment 280.

The curriculum environment 280 may include a server cluster 210 of one or more servers (e.g. 214, 218) that provides curriculum functionality. These, or other servers (not shown), may support access to the environment by members of the user 270. Access to the environment by these various users may be via any suitable communication channel, which in a typical embodiment will be a computer network such as the Internet 260 and/or Ethernet 250. In other environments, access may be via other forms of computer network, direct dial-up connection, dedicated connection, direct or indirect connection such as via a bus connection, parallel or serial connection, null modem connection or wireless connection utilizing an appropriate communication protocol such as BLUETOOTH, IRDA, 802.11b or other suitable channel as would be known to those skilled in the art. Some embodiments may use and/or require a combination of communication vehicles, such as those previously described, to serve as the communication channel. In some embodiments the access channel may provide security features, either session-based and/or layer-based; for instance, a secure socket layer (SSL) may be used with respect to an embodiment using the Internet 260 as the access communication channel. The one or more servers of the server cluster 210 may include or connect to a data store 240 for storing student data, activity data and/or question data.

The conveyance of information to and from the user of the curriculum environment occurs via a link, or interface, to or with a suitable communication channel for conveying the information. The link will depend upon the curriculum environment implementation and the communication channel, or the first portion thereof where the communication channel is composed of several portions of potentially varying types. Depending upon the characteristic of the link, the link may allow selective communication with one or more user computers. In most cases, the curriculum environment communicates information to the applicant through a processor such as a computer, which may, in certain embodiments, provide server functionality, and be part of a server cluster; where the source of the communication is a processor, the link may be a wired or wireless modem, a serial or parallel interface, a network interface, a bus interface or combinations thereof where communication may occur via multiple communication channels or where differing types of communication occur through potentially different channels. The communication channel usually consists of one or more of the following types of channels: computer network, direct serial or parallel connection, dial-up connection, dedicated line connection, wireless connection, bus connection and combinations thereof. The communication channel may further consist of a variety of computer network types including an Ethernet, a token ring network, the Internet and/or combinations thereof. Communication may use any suitable protocol; however, in most instances, the protocol selected will depend upon the communication channel. Typically, the protocol is one or more of the following protocols alone, or in combination where multiple types of channels form portions of the communication channel: HTTP, HTTPS, SMTP, FTP, GOPHER, and WAIS as layer 3 protocols and/or TCP/IP, IPX, NETBEUI, 802.11b, BLUETOOTH as layer 2 protocols and/or interprocess communication such as RPC, DCE, IIOP, COM, etc.

The various components of the environment 280 may communicate with each other through any suitable communication architecture including, but not limited to, a computer network such as a Ethernet 250, token ring network or the Internet 260; a direct connection such as a bus connection, parallel or serial connection, null modem connection, dedicated line or wireless connection utilizing an appropriate communication protocol such as BLUETOOTH; a dial-up connection; and appropriate combinations thereof. In embodiments where a single computer may provide all functional components, the communication may occur via bus connections, interprocess communication, shared files or some combination of these methods or other commonly used single-computer communication mechanisms.

The architecture, seen in FIG. 1, use the Internet 260 and an Ethernet 250 as communication channels allowing access to the environment by various members of the user community 270. The environment uses a computer network such as the depicted Ethernet 250 to allow communication among the components of the environment; a router (not shown) may be included in the environment to manage such communication within the internal network as well as managing the interface between the internal network and the Internet 260. The functionality of the environment is spread among a server cluster 210, a data store 240 and, in some embodiments, a load-balancing device 220. Where a load-balancing device 220 is present, the device may be responsible for allocating and managing distribution of access among various elements within the server cluster 210 and/or the data store 230. Users may access the environment through standard Web browser software or via specialized access software adapted for interfacing with the curriculum environment 280.

The server cluster 210 provides the desired functionality of the environment 280. In some embodiments, the server cluster 210 may be divided into access servers and application servers where the access servers provide electronic access functionality such as by electronic mail server(s) and/or Web server(s) and the application servers provide the desired curriculum functionality. In some such embodiments, the one or more servers (e.g. 214, 218) in the server cluster 210 may be supported via Intel-compatible hardware platforms preferably using at least a PENTIUM III (Intel Corp., Santa Clara, Calif.) or UltraSPARC (Sun Microsystems, Palo Alto, Calif.) class processor. In some embodiments, curriculum and/or access functionality, as further described below, may be distributed across multiple processing elements. The term processing element may be a process running on a particular piece, or across particular pieces, of hardware, a particular piece of hardware or either as the context allows. The hardware platform would have an appropriate operating system such as WINDOWS/NT, WINDOWS 2000 or WINDOWS/XP Server (Microsoft, Redmond, Wash.), Solaris (Sun Microsystems, Palo Alto, Calif.), or LINUX (or other UNIX variant).

Depending upon the hardware/operating system platform, appropriate server software may be included to support the desired application, email and Web server functionality. The Web server functionality may be provided via an Internet Information Server (Microsoft, Redmond, Wash.), an Apache HTTP Server (Apache Software Foundation, Forest Hill, Md.), an iPlanet Web Server (iPlanet E-Commerce Solutions—A Sun-Netscape Alliance, Mountain View, Calif.) or other suitable Web server platform. The email services may be supported via an Exchange Server (Microsoft, Redmond, Wash.), sendmail or other suitable email server.

Application servers in some embodiments may be iPlanet Application Servers (iPlanet E-Commerce Solutions—A Sun-Netscape Alliance, Mountain View, Calif.), WebSphere Servers (International Business Machines, Armonk, N.Y.), Tomcat Java Servlet/JSP Engine (Apache Software Foundation, Forest Hill, Md.), or WebLogic Application Server (BEA Systems, Inc., San Jose, Calif.). In some embodiments, the application services may be provided through programmed pages on the Web server; such pages may use ASP (Microsoft, Redmond, Wash.), ColdFusion (Macromedia, San Francisco, Calif.), Java Servlet (Sun Microsystems, Palo Alto, Calif.) or other suitable technologies to provide server side logic and may use ActiveX (Microsoft, Redmond, Wash.), VBScript (Microsoft, Redmond, Wash.), JavaScript/ECMAScript (ECMA, Geneva, Switzerland) or other suitable technologies to support client side logic.

The data store 240 provides for the storage and, potentially, the management of the data required by the environment. A typical data store 240 will include one or more storage devices (e.g. 222, 224, 226 & 228), and in some embodiments, may include one or more data servers 230 to receive and service data requests. The data store depicted in FIG. 1 uses a server 230 and several external data repository 222, 224, 226 & 228. These depictions are representative only, and consequently, other data store architectures may have single, multiple and/or varied servers and storage elements. For example, the system data store may use internal storage devices connected to one or more of the server processors (214, 218) of the server cluster 210. In embodiments where a single processor supports all functionality of the environment, a local hard disk drive may serve as the system data store, and a disk operating system executing on the single processor acting as a data server may support receive and service data requests.

Information concerning different users (including students, administrators, teachers, curriculum developers, parents, etc.), activity data associated with various challenges with which students may interact, and question data may be stored in the data store 240. Question data typically includes question text and one or more possible answers including at least one correct one; question data may also include other characteristics associated with a given question such as a language and/or nationality indicator, a topic indicator, a difficulty indicator, etc. It will be understood by those of skill in the art that these different types of information may be logically or physically segregated within a single system data store; multiple related data stores accessible through a unified management system, which together serve as the system data store; or multiple independent data stores individually accessible through disparate management systems, which may in some embodiments be collectively viewed as the system data store. The various storage elements that comprise the physical architecture of the system data store may be centrally located, or distributed across a variety of diverse locations.

The architecture of the data store 240 may vary significantly in different embodiments. In several embodiments, database(s) are used to store and manipulate the data; in some such embodiment, one or more relational database management systems, such as DB2 (IBM, White Plains, N.Y.), SQL Server (Microsoft, Redmond, Wash.), ACCESS (Microsoft, Redmond, Wash.), ORACLE 8i (Oracle Corp., Redwood Shores, Calif.), Ingres (Computer Associates, Islandia, N.Y.), or Adaptive Server Enterprise (Sybase Inc., Emeryville, Calif.), in connection with a variety of storage devices/file servers that may include, in some embodiments, an tape library such as Exabyte X80 (Exabyte Corporation, Boulder, Colo.), a storage attached network (SAN) solution such as available from (EMC, Inc., Hopkinton, Mass.), a network attached storage (NAS) solution such as a NetApp Filer 740 (Network Appliances, Sunnyvale, Calif.), or combinations thereof. In other embodiments, the data store may use database systems with other architectures such as object-oriented, spatial, object-relational or hierarchical or may use other storage implementations such as hash tables or flat files or combinations of such architectures. Such alternative approaches may use data servers other than database management systems such as a hash table look-up server, procedure and/or process and/or a flat file retrieval server, procedure and/or process.

Figure 3:
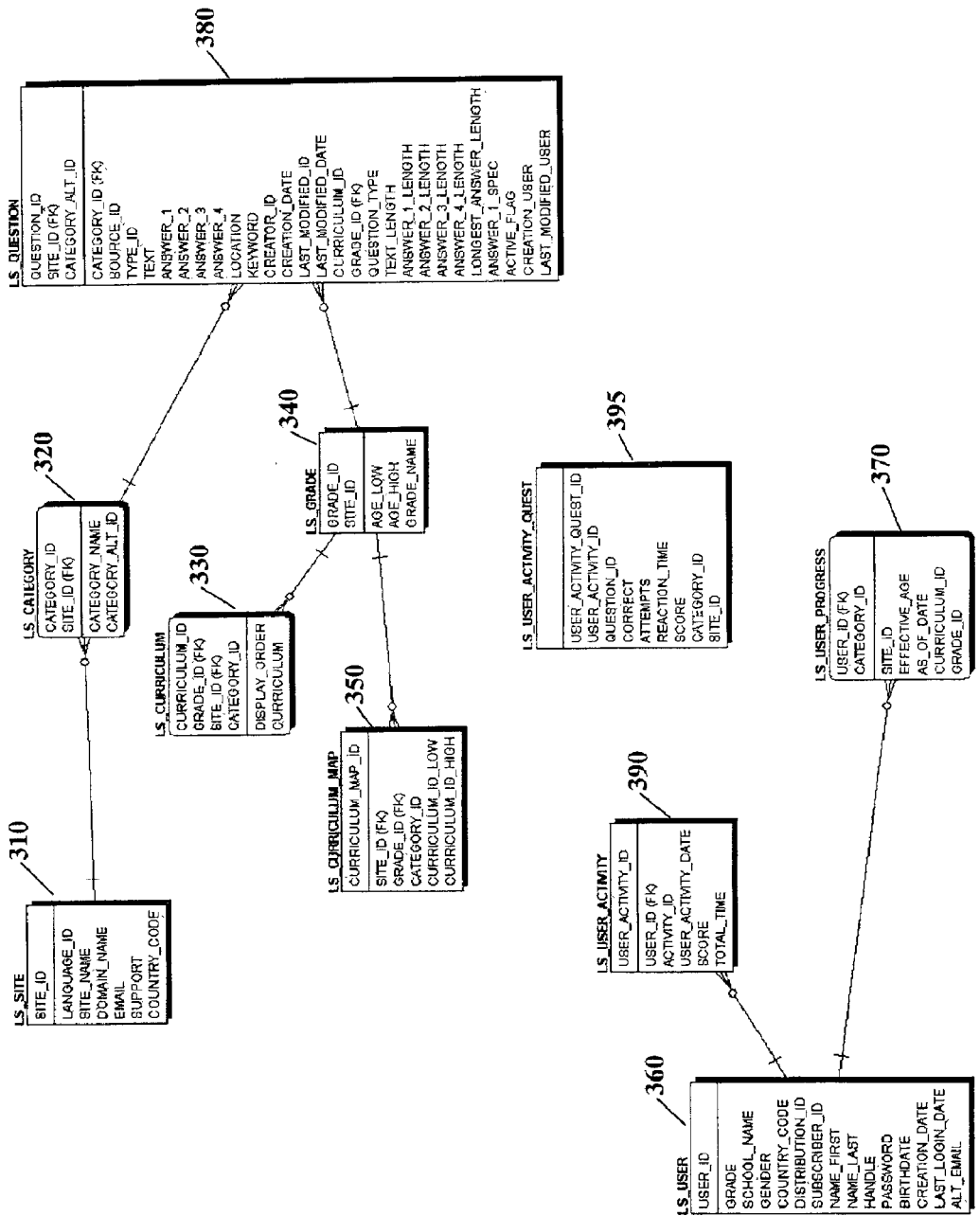
FIG. 3 is an entity relation diagram depicting key entities and relationships among them for a relational database data store used in a typical embodiment.

FIG. 3 is an entity relation diagram showing the entities and relations used in one embodiment that uses a relational database architecture for the data store. The architecture uses the following tables:

SITE 310—Used for identification of system. This is the source table for Language Assignment.

CATEGORY 320—Subject of study: Grammar, Science, History, and Geography.

CURRICULUM 330—Objective associated with the category.

GRADE 340—Level of study appropriate for a specified age range.

CURRICULUM_MAP 350—Assignment (product) table for category, curriculum, site and grade. Contains a record for every valid combination of the joined tables.

USER 360—The user record.

USER_PROGRESS 370—Assignment (product) table for category, and user. Tracks the current status of user progress within a curriculum.

QUESTION 380—Table contains the content (questions & answers) keyed by category, site, curriculum and grade.

USER_ACTIVITY 390—Tracks the user against the activities (properties, or challenges)

USER_ACTIVITY_QUEST 395—Tracks the questions and corresponding results (grading) for every question and user_activity pairing.

The site table 310 is used for localization, and language assignment. The category table 320 provides skill or subject area declaration and is used as a foreign key in curriculum and question. The curriculum table 330 supports a hierarchical arrangement of lessons and levels for each category of material to be tracked. This arrangement can be tailored via assignment tables that aggregate the information on a site-by-site basis. The grade table 340 is used to assign a range of ages to a particular level of study.

The curriculum map table 350 contains the product of several tables and is populated with the following code:
Insert into curriculum_map
Select sequence.next_val, e.site_id, d.grade_id, e.category_id, a.curriculum_id, b.curriculum_id
From curriculum a, curriculum b, category c, grade d, site e
Where a.site_id=b.site_id And a.site_id=c.site_id
And a.site_id=d.site_id
And a.site_id=e.site_id
And a.grade_id=d.grade_id
And b.grade_id=d.grade_id
And a.category_id=e.category_id
And b.category_id=e.category_id
And a.curriculum_id=(select min(f.curriculum_id) from curriculum f
   Where f.site_id=a.site_id and f.category_id=a.site_id and f.grade_id =a.grade_id)
and b.curriculum_id=(select max(g.curriculum_id) from curriculum g
   Where g.site_id=b.site_id and g.category_id=b.site_id and g.grade_id=b.grade_id)

The user table 360 is the unit identifier that progress is tracked against. When a user is entered into the system a baseline record is created in the database using the user progress table 370. This baseline is a single record for each category in the curriculum with the initial curriculum bookmark set to the initial (lowest) value. The determination of the initial values for "USER_PROGRESS" can be based on a variety of criteria that may include age, education level, assignment by a parent or teacher and combinations thereof. This table is referred to frequently (used in most table joins) when delivering content. Because this is a summary table based on the aggregation and cumulative experience gained it does not grow beyond the initialization records. Potentially frequent updates can occur based on system usage (and user successes, or failures).

The user activity table 390 tracks the user against activities (properties, or challenges). Every entry into the curriculum environment is applied against this table, which is used as a key in user activity quest table 395. Because every challenge has a different level of difficulty it is necessary to track the responses to every question and the activity in which it was presented via the user activity quest table 395. This allows a handicap scoring system to be employed where the correct answer and total score is placed in context.

The question table 380 contains the content (questions & answers) keyed by category, site, curriculum and grade. At least one correct answer is always stored; in this embodiment, the correct answer is always stored in the answer_1 field. This allows curriculum delivery environment to reorder the potential answers and present the same question to be offered several times but with the correct answer in a different location each time.

The curriculum is the framework, or roadmap for information delivered by the curriculum environment. The organization of the information is critical to the utility of the application. It is important to have both forward and backward references from any point in the curriculum to allow for advancement or regression as appropriate.

The tables below provide example objective, navigation and content for a second grade science assignment.

| Objective | Current Level | Prior Level | Next Level | Bonus Level | Content |
|---|---|---|---|---|---|
| Classify Animals | 2400 | 1570 | 2410 | 3100 | Vertebrates Invertebrates |

In this example the second grade science objective to classify animals as either vertebrates or invertebrates has been assigned a current level of 2400. The Prior level is the pointer to the fundamental or prerequisite information on this topic. The Bonus Level is used when a challenge topic or "extra credit" is offered.

Questions are the intellectual content delivered by curriculum environment. There is a defining relationship between questions and curriculum, where all questions belong to one or more curriculum level(s). In addition to the specified curriculum, the language is also a defining attribute.

The following question example builds on the previous curriculum detailed above:

| Lang. | Cur. | Ans.1 | Answer2 | Answer3 | Answer4 | Question |
|---|---|---|---|---|---|---|
| Eng. | 1570 | Cow | Kangaroo | Trout | Lobster | A large grass eating four-legged animal that gives us milk to drink. |
| Eng. | 2400 | Cow | Lobster | Spider | Human | This warm blooded animal has an internal skeleton and walks on four legs |
| Eng. | 1560 | Bee | Spider | Sparrow | Lobster | The insect makes honey. |
| Eng. | 1530 | Lobster | Trout | Cow | Llama | I live in the water and have large claws. |

In the preceding examples each question is demonstrated to have an assigned language and curriculum. For each question four possible answers are provided. The actual processing and combination of questions and curriculum is detailed in the following sections.

Various methods and functions as exhibited in various embodiments according to the present invention are described below with respect to adaptive content delivery, question bias evaluation, curriculum development and curriculum assignment. In some embodiment, one or more processors within architectures of the environments as described above may execute the steps in such methods and provide such functionality. The functionality may spread across multiple processing element; in certain embodiments, these processing elements may logically and/or physically be divided into access, curriculum logic and data storage processing elements where functionality is allocated appropriately among such processing elements. In other embodiments, any suitable computer readable storage device, including primary storage such as RAM, ROM, cache memory, etc. or secondary storage such as magnetic media including fixed and removable disks and tapes; optical media including fixed and removable disks whether read-only or read-write; paper media including punch cards and paper tape; or other secondary storage as would be known to those skilled in the art, may store instruction that upon execution by one or more processors cause the one or more processors to execute the steps in such methods and to provide such functionality.

Adaptive Content (Curriculum) Delivery

Figure 2:
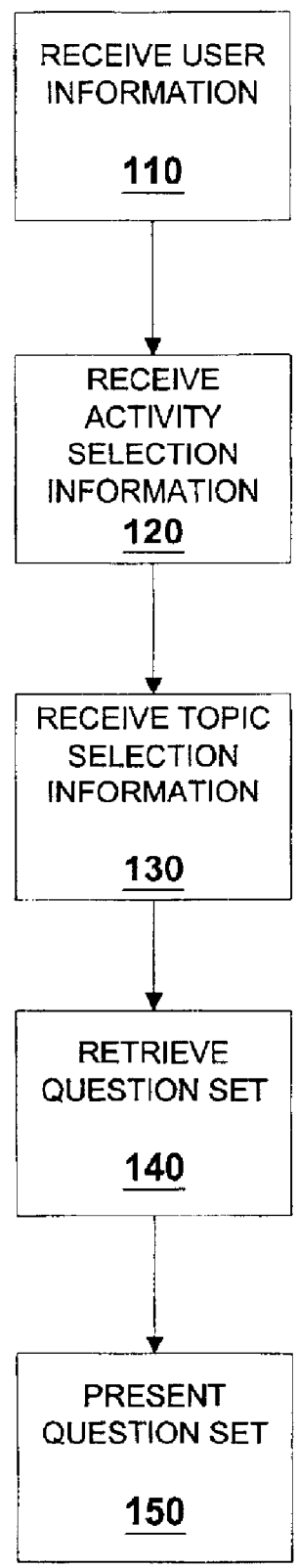
FIG. 2 is a flow chart depicting the steps in a process for delivering adaptive content.

Adaptive content is provided to a user via a user output device according to the present invention. FIG. 2 is a flow chart of a typical delivery process. In step 110, user information associated with a particular user is retrieved. In some embodiments, this retrieval may be the result of receiving identification information associated with the user and retrieving the user information from a user information data store. The identification information may be received via any suitable mechanism. One such mechanism would be presenting an interface to the user via the user output device requesting entry of the identification information and receiving the identification information from the provided interface; such an interface could potentially be coded as an HTML form or a JAVA applet. Another mechanism could include parsing the identification information from an HTML request that pulled the identification information from a browser cookie residing on the user's computer. Alternatively, the entirety of the user information could be entered via a provided interface or parsed from an HTML request that pulled the user information from a browser cookie residing on the user computer. The received user information generally includes identification information and characteristics of the particular user. These characteristics could include name, age (and/or date of birth), education level, language preference (and/or nationality), default activity, gender, default topic, assigned activity/topic/difficulty and historical performance. Difficulty level may in some instance be determined by such user information as age, grade, teacher or parental guidance, past performance and combinations thereof. The initial difficulty level may be determined from a static weighting of a combination of one or more of these criteria. Ongoing determination of difficulty level detailed in FIG. 7 and corresponding explanation.

In some embodiments, an interface may be provided through which a user can enter and submit user information updates. User information, submitted as an update or received through some other mechanism such as described above, may in some embodiments be stored in a user data store, which may be logically or physically part of an overall system data store, logically or physically separate from such a system data store or both where portions of the user data store would be part of the system data store and part would be separate.

In step 120, activity selection information is received. The activity is selected from a set of one or more available activities. A filtering constraint, as described in more detail below, may be used to specify the set of available activities in some embodiments. The selected activity is used as the vehicle for delivering the curricular materials. The activity selection information may be received via any suitable mechanism; some embodiments may support one or more such mechanisms. For example, the activity selection information could be determined from the user information received in step 110. An indicator of the activity could be parsed from the user information (e.g., particular default activities associated with particular topics). A key within the user information may be used to retrieve the activity selection information from an appropriate data store. The activity may be determinable from miscellaneous components of the user information (e.g., activity determined by user age and selected topic or topic designated in user information). Instead, or in addition, the activity could be determined directly, or in conjunction with the user information, by the selected topic indicated by the topic selection information received in step 130.

Another approach to receiving activity selection information involves providing the user with an interface by which the user may indicate a selected activity. The indication entered by the user is then received. This indication may constitute the activity selection information, or may be used to determine it. In some embodiments, the provided interface may only allow selection of an activity from a select subset of all available activities. This subset may be determined based upon characteristics of the user determined from the user information in step 110 and/or the selected topic indicated by the topic selection information received in step 130.

An activity is an interface through which a question set is presented to a user. This can be accomplished with several different types of activities. These activities may each present the information in a different manner. Examples would include: traditional multiple choice testing, games that incorporate an arcade style interface to select the correct answer, stories that allow users to progress through correctly answering questions, puzzles (e.g. hangman) derived from single word short answers and other suitable activity formats. To compensate for the potential variance in performance when answering a question in a variety of ways each presentation of questions via a specific activity is logged for potential analysis.

Activities are encoded in any suitable form allowing interaction with the user. The activity further must have the capability either to dynamically pull questions and answers or to pre-load the questions and answers into the activity framework. Typically, activities may be encoded using FLASH, HTML, VRML, SGML, XML, Java, C, C++, Pascal, BASIC, DIRECTOR, PDF and combinations thereof.

In step 130, topic selection information is received indicating a selected topic for content delivery via the selected activity. A filtering constraint, as described in more detail below, may be used to specify the set of available topics in some embodiments. The receipt of topic selection information may occur via any suitable mechanism; various embodiments may support one or more such mechanisms. Potential mechanisms are similar to those described above with respect to receipt of activity selection information. For instance, an interface may be created and presented to the user allowing selection of an indicator of the selected topic. The creation of such an interface may involve the filtering of the complete set of available topics to a subset of topics for presentation in the interface. This filtering could be based upon a portion of the received user information and/or the selected activity. The topic subset for a particular user may, in certain embodiments, be contained in the received user information for that particular user. In other cases, an interface need not be required; for example, the topic selection information may be included in the received user information. In such instances, the topic selection information may be parsed, or determined, from the received user information. The selected activity may in some cases be used in this process. In other situations, the selected activity alone may directly determine the topic; for example, where only one topic may be used with a given activity.

In a typical embodiment, the questions are retrieved from a question data store, which may or may not be part of a system data store; the retrieval may be in response to a request. However, some embodiments may instead, or in addition, retrieve a portion of the questions from a storage environment local to the user's output device.

In step 140, one or more questions are retrieved for presentation to the user. In some embodiments, this step, and the presentation through the selected activity 150, may occur in an iterative manner whereby retrieval of further questions in step 140 will occur as a result of user interactions with the activity and prior retrieved question(s) from this step. In other embodiments, the complete set of questions for use with the particular selected activity is retrieved at step 140, such as where all questions are loaded into an activity framework for the selected activity prior to step 150. The retrieved questions are based upon at least the selected topic. In most instances, the questions retrieved are also based upon a portion of the received user information and/or the selected activity.

Figure 5:
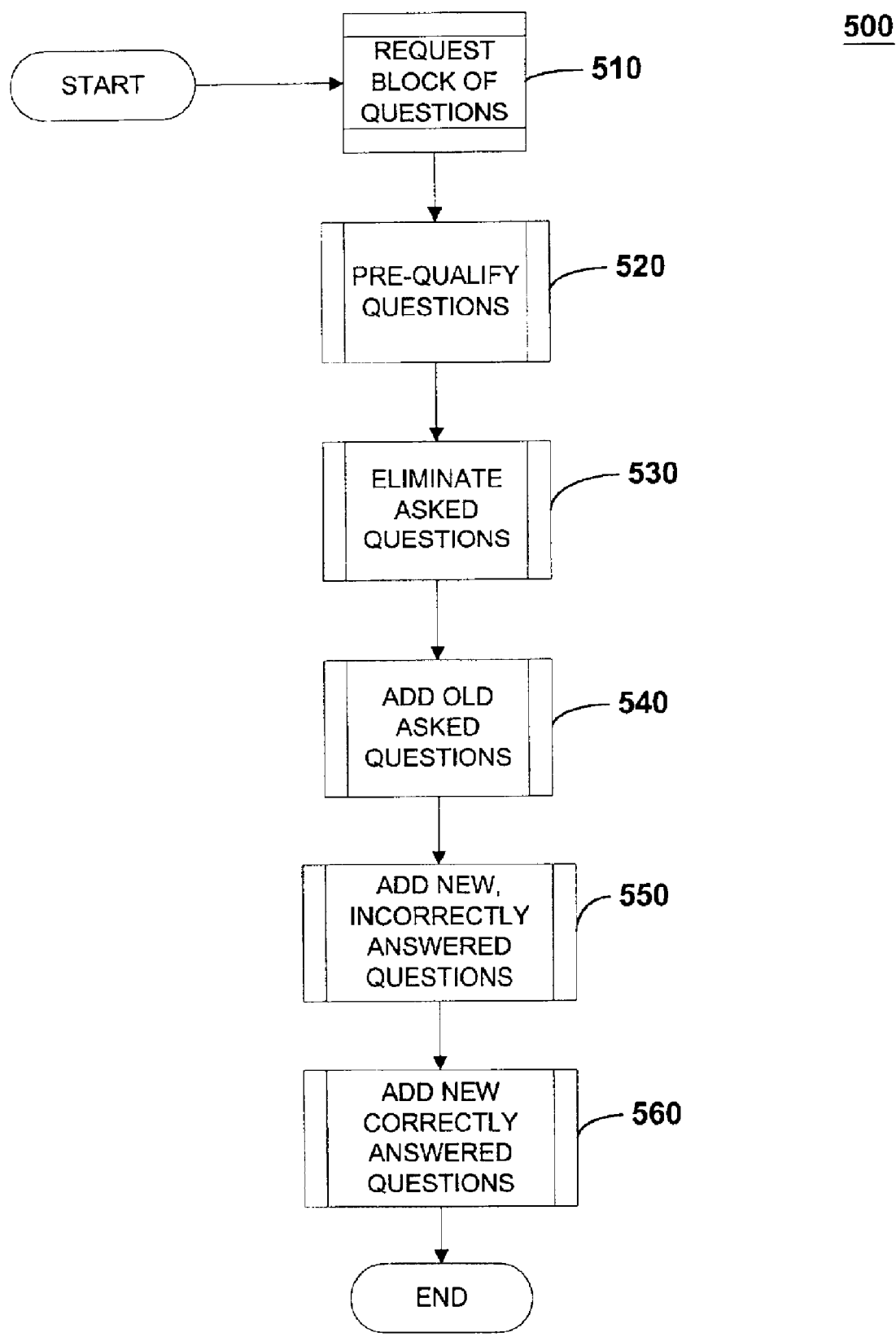
FIG. 5 is a flow chart of a question retrieval process according to the present invention.

FIG. 5 is a flow chart depicting steps in a typical question retrieval process 500 according to the present invention. In step 510, a block of questions appropriate to a given users difficulty level and selected topic is requested, and the results received. Questions are removed as inappropriate to a selected activity and/or as a result fine-tuning of the difficulty in step 520. Questions already presented to the particular user are removed in step 530. In step 540, a subset of older, previously presented questions are added back to the question pool. In steps 550 and 560, more previously presented question are added back into the pool, namely recent incorrectly and correctly answer questions, respectively.

In step 150, the user is provided with an opportunity to interact with the selected activity via the user's output device. In a typical embodiment, the user's output device will be a user computer equipped with suitable browser software, browser enhancement software (plug-ins) such as FLASH plug-in, VRML interpreters, PDF viewer, DIRECTOR plug-in, etc. and/or curriculum interaction software adapted for use with a curriculum delivery environment according to the present invention. The step may occur in response to receiving a request from a particular user using a particular user output device. Information in such a received request may serve as at least a partial basis for determining the user information, the selected activity, the selected topic and the retrieval of questions in the foregoing steps. In the discussion that follows, the term user computer is used to refer to the user output and/or input device as a matter of convenience; as will be understood by those skilled in the art, other forms of user input and output devices may be substituted within the scope of the present invention.

The activity information associated with the selected activity such as activity framework, activity data and/or question data is retrieved and transmitted to the user's output device via a suitable communication channel. In instances where parameters of the communication channel and/or the user's output device are available, the retrieval may selectively retrieve activity information based upon the available parameters. For example, a computer network such as the Internet, an Ethernet, a token ring network; direct dial-up connection; dedicated connection; direct or indirect connection such as via a bus connection, parallel or serial connection, null modem connection; wireless connection utilizing an appropriate communication protocol such as BLUETOOTH; or combinations thereof may be used as this communication channel.

Typically, the activity information will be retrieved from a system data store, and retrieval may result from a request for such information. In some embodiments, the activity framework and/or question data, or portions thereof, may be locally accessible to the user's output device such as previously cached activity information/data or as stored on an external media such as a CD-ROM. In such embodiments, only a limited amount of activity data need be transmitted via the communication channel; in some embodiments, all activity framework and/or question data may reside locally only requiring transmission of information necessary to activate the proper activity with a supply of the appropriate questions. The user is able to interact with the selected activity via the output device.

In one embodiment, the process of using the curriculum and attempting the questions creates a journal where that activity is recorded. This journal contains the raw data on which a portion of the adaptive process of curriculum delivery environment acts. An example of such a question journal is as follows:

| User | Activity | Date | Question | Correct | Attempts | Reaction Time | Activity Time |
|---|---|---|---|---|---|---|---|
| Kevin | Robot | 12-31-1999 | 1 | Y | 1 | 45 | 150 |
| Kevin | Robot | 12-31-1999 | 2 | Y | 1 | 45 | 150 |
| Kevin | Robot | 12-31-1999 | 3 | N | 3 | 60 | 150 |
| Kevin | Race | 01-01-2000 | 3 | Y | 1 | 45 | 200 |
| Kevin | Race | 01-01-2000 | 4 | Y | 1 | 60 | 200 |
| Kevin | Race | 01-01-2000 | 5 | Y | 1 | 95 | 200 |
| George | Robot | 01-01-2000 | 1 | Y | 1 | 35 | 120 |

In this example "Kevin" used the system with both the "Race" and "Robot" activities. These activities where configured to pull from the same question base, because question "3" was repeated on both "Robot" and "Race" activities. The other information captured is presented as Question, which is the unique identifier, assigned to each question. Correct, which is a Boolean indicator for a correct response to the question. Attempts represent the number of times the question was presented before the correct answer was entered. Reaction time is associated with the amount of time that elapsed between presentation and selection of the correct answer. The Activity Time is the total elapsed time between the presentation of the first question and the entry of the correct answer to the final question.

The curriculum delivery environment uses the Question Journal to profile and adapt the curriculum to the user. Summary Information leverages the raw data into a series of data points that are compared to both static and dynamic guards. A static guard could be described as a definition, or type of object. A grade would only be compared to other grades. A dynamic guard would compare an object against a standard that all data points must pass. An example would be: The minimum passing grade is 70%. Where the data point is "grade" and the static guard is greater than or equal to 70%. Other examples of static and dynamic guarding within the system are present in the curriculum. The curriculum level would be the static guard, with the next, prior, and bonus levels being the dynamic component.

One of the advantages according to the present invention is the "Repeat, Retest and Retake" (3R's) adaptation built in. A system built only on a workflow premise would not allow for the reinforcement of the material with the 3R's. By leveraging the question journal the environment adapts by Repeat of material that was answered incorrectly, or Retest of select questions or Retake of material that was completed some time ago.

Figure 6:
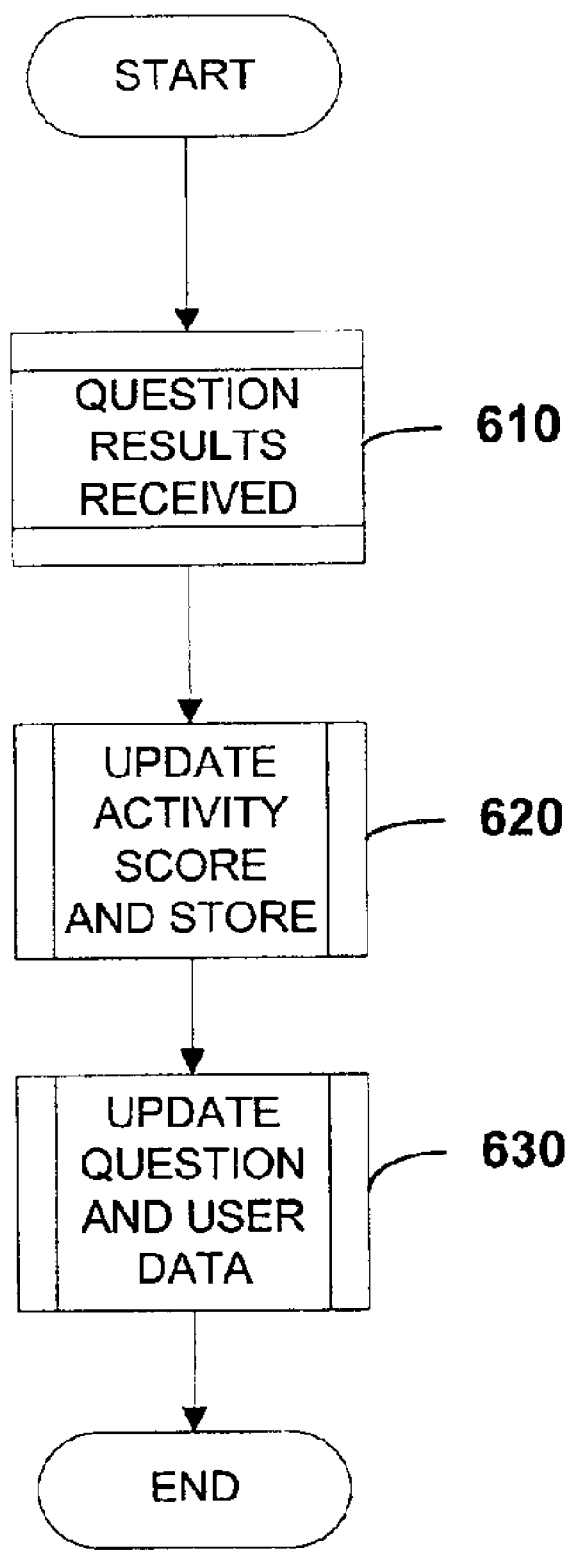
FIG. 6 is a flow chart of a question response handling process in a typical embodiment.

FIG. 6 is a flow chart of a process, in one embodiment, for handling the data generated through the user providing responses to questions while interacting with the selected activity. In step 610, question results are received from the interactions with the user. In step 620, activity pertinent data such as the user's score and use of the particular activity wither respect to particular questions, topics and difficulty levels are received and stored. In step 630, user information in the user data store and/or question data in the question data store are updated. In different embodiments, this process may occur iteratively with the results of each individual question presented or may occur as a batch process at the completion of a user's interaction with the selected activity.

Figure 7:
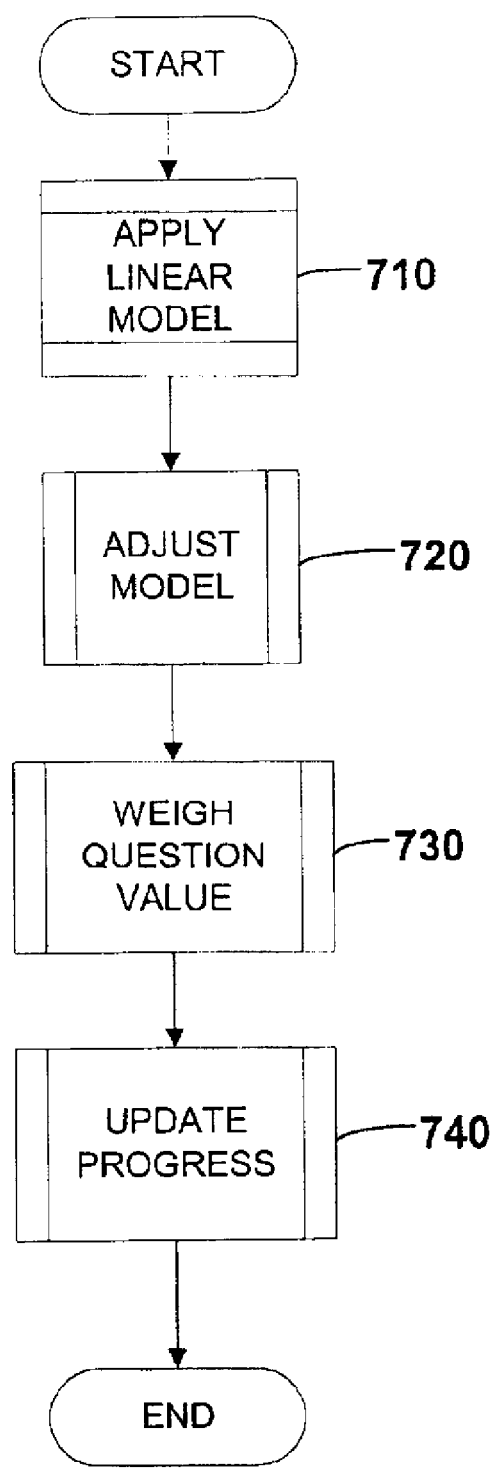
FIG. 7 is a flow chart of a user progress update process in a typical embodiment.

FIG. 7 is a flow chart of a typical user progress update process according to the present invention. In step 710, a linear model is applied. This model is simple in it's implementation. Calculate the aggregate value across dimensions for each measure. For example, find the average score for US, Females, Age 7, who speak English on all activities. Save these values until a statistically significant collection is accumulated then analyze the model for fitness. In step 720, the model is adjusted. After each session, validate linear model by checking for skew based on challenge attempted. This may be implemented as a standard deviation analysis where the fitness of the object under analysis is rated (and retained) if it is within one standard deviation of the norm. Because the online system is available before this validation is processed the fitness testing cannot be applied until a statistically valid sample has been achieved. It is possible that initial users will be using un-validated material, but this is a natural occurrence. The aggregate analysis applies to categories and curriculum, while the transactional analysis applies to individual questions.

Compare at aggregate and transaction level.
Return 0 for within 1 std dev.
Return 1 for above +1 std dev
Return −1 for below −1 Std dev
How did user aggregate score (in age) against other users in their country
How did user aggregate score (in age) male vs. female
How did user aggregate score (in age) against other users world wide.
How did user aggregate score (in age) against others users, other languages
How did user transaction score (in age) against other users in their country
How did user transaction score (in age) male vs. female
How did user transaction score (in age) against other users world wide.
How did user transaction score (in age) vs. same question other activity In step 730, question values are weighed by assigning a number value of −1, 0, 1 for each of the Previous model adjustments. If the average of these values is negative, then skip question in scoring decision. If the average of these values is positive, use the question in the scoring decision.

Finally, in step 740 progress of the user is updated. After each session test if milestones in linear model have been met.

1. 80% of questions have been attempted.
2. Percentage of correct answers>=80%
3. If exists another objective in this level, set bookmark to new objective.

4. If not exist another objective in this level, set user progress to next level in this category. Set curriculum id to entry point for new level.

OR 1. 80% of questions have been attempted
2. Percentage of correct answers<=60%
3. If exists a prior objective in this level, set bookmark to previous objective.
4. If not exist prior objective, set $user_{13}$ progress to previous level. Set curriculum it to exit point for new level.

In some embodiments, a further step (not shown) may involve storing performance metrics associated with a user's progression through the selected activity in a data store. This information may involve updating records associated with the particular user, the particular activity and/or the particular questions. In addition, some embodiments may allow presentation of such performance metrics to the particular user and/or other designated users whether or not the performance metrics are stored. Where prior records for a particular user exists, collected metrics may be aggregated with the existing prior records.

In some such embodiments, a supervisory user, typically a teacher or parent, may have the ability to access the stored performance metrics associated with a given student, or group of students. Identification information corresponding to one or more student users is received via any suitable mechanism. For example, an interface may be provided into which student, and/or student group, identification(s) may be entered or from which student(s), and/or student group(s), may be selected. In other cases, the student identification information may be received indirectly based upon information associated with the supervisory user. For instance, all student users in a given class or all student users in a given family may be associated with a particular supervisory user. This information may be stored in a user data store and retrieved based upon the identity of the supervisory user.

Some embodiments may also provide a further step (not shown) of determining a filtering constraint such as a user's language, a user's nationality, characteristics associated with the user's user computer and/or characteristics of the user computer's communication channel with the curriculum delivery environment. Some characteristics of the user computer and/or the its communication channel include, without limitation, display resolution, bandwidth, processing speed, memory, presence of previously cached activity information or of activity information available via a locally connected peripheral device (e.g., CD-ROM), and type of channel (e.g., dial-up, computer network/Internet).

In such embodiments, this determined information may impact the execution of several of the steps according to the present invention. This determined information may constrain the receipt of activity selection information in step 120. Certain activities may only be available, or may not be available, to users who speak a particular language, reside in a particular country and/or have a user computer with particular characteristics. Similar constraints may impact upon the receipt of topic selection information in step 130 and/or the retrieval of questions and answers in step 140. Finally, step 150 involving providing the user with the ability to interact with the selected activity may be impacted by determined characteristics of the user's computer and/or communication channel; for instance, different variations of given activities may exist where the chosen variation will depend upon these characteristics. In such a way, adapting the interactive activity to best take advantage of the user's computer and/or communication channel enhances the user's experience.

The filtering constraints may be determined in a variety of ways including automated detection, automated derivation and/or retrieved. In many instances, the filtering constraints may be determined from the received user information. In others, the curriculum environment may automatically detect or derive the filtering constraint. For example, the environment may be able to detect parameters of the user's communication channel or may be able to query the user's computer for various characteristics. In one embodiment where a language indicator is used as a filtering constraint, the language indicator may be inferred based upon the selection of a particular access processor of the curriculum environment. In such an embodiment, one or more sets of logically or physically separate accesses servers exist where each such set delivers content in a particular language. An access request by a user to a particular set of access servers can then provide the needed language indicator. For instance, directing a request to interact to www.MySpanishServer.com would indicate Spanish as the language indicator for the user initiating the request, whereas a request to www.MyEnglishServer.com would indicate English as the language indicator.

In some embodiments, a curriculum assignment component may be present. In some such embodiments, an interface may be provided to a teacher user through which the teacher user may select and specify particular activities, topics, and/or questions for a particular student user, or group of student users. The interface allows the teacher user to submit these specified activities, topics and/or questions to the environment. The interface may further allow the teacher to specify one or more student users to which the specified activities, topics and/or questions are to apply. Once received, this information is stored in user information associated with the particular student user(s). More detailed discussion of curriculum assignment is provided below.

Evaluating Question Bias (Curriculum Evaluation)

The curriculum delivery processes and systems as described above support the evaluation of user performance when working through a curriculum set in a specified manner. These processes and systems also define a curriculum structure and a method for capturing user performance data. Taking advantage of the structure and artifacts generated through the use of these curriculum delivery mechanisms, it is possible to invert the evaluation process and judge the curriculum structure based upon the user performance data. In order to perform this inverse evaluation, it is necessary to introduce the concepts of expectations and fitness.

Expectations are used to express the expected distribution of user performance according to some defined set of user attributes. Fitness is a measurement function used to judge how closely the user performance data matches a particular set of expectations.

Assume a set of users:

M: $\{\mu_i\}$, i=1 ... n

Associated with M is a set of attributes:

A: $\{\alpha_i\}$, i=1 ... n.

The set of collective user performance for any challenge $\chi$ forms a vector, P, of size n, where each member $\rho_i$ is the performance outcome for user $\mu_i$ when presented with challenge $\chi$:

P=$[\rho_1, \rho_2, \ldots, \rho_n]$

Expectations are expressed through a range of functions E $\beta(\alpha_1)$ for any value of $\beta$. The value $\beta$ is from the same domain as the members of A. The values produced by E $\beta(\alpha_1)$ are from the same domain as the members of P.

For a given set of attributes, A, and a given value of $\beta$, the expectations for those users are expressed as the vector:

$\Phi_A(\beta) = [E\ \beta(\alpha_1), E\ \beta(\alpha_2), \ldots, E\ \beta(\alpha_m)]$ To measure how well expectations for a particular value of $\beta$ match user performance on any challenge, a fitness function with parameters P and $\Phi_A(\beta)$ is used:

$\Gamma(P, \Phi_A(\beta))$

The values produced by the fitness function are from a domain with a strict order. For any set of values:

B: $\{\beta_j\}$, j=1, ..., m a set of fitness values is produced from $\Gamma(P, \Phi_A(\beta))$.

H: $\{\Gamma(P, \Phi_A(\beta_j))\}$, j=1, ..., m

The member of B, $\beta_j$, with the corresponding maximum fitness in H is considered to produce the best fit to the expectations.

User Representation

User data may be represented by a tuple of strings. This representation would be easily stored within a table in a relational database. For example, supposing the relevant user data are the user name, key, and birth date, where the key is a unique identifier associated with each user such as a unique string. This can be represented by a 3-tuple of the form:

(N, K, B)

N=name

K=key

B=birth date

User Attributes

A natural expression for the user attributes would be the users' ages rounded to the nearest year. The domain for these attributes would be the set of positive integers. This representation of age can be computed by subtracting the stored birth date from the present date and rounding to the nearest year.

Performance Outcome

A simple implementation of performance outcome would be pass/fail expressed as $\{0,1\}$, where 0 indicates fail and 1 indicates pass.

Expectations

The expectation for any age, $\beta$, in this case is a step function, where:

$E\ \beta(\alpha_i)=0, \alpha_i<\beta$ $E\ \beta(\alpha_i)=1, \alpha_i>=\beta$

Fitness

The parameters for the fitness function, in this case, are two vectors of binary elements. These vectors can be expressed as:

$Y_1=[\upsilon_{11}, \upsilon_{12}, \ldots, \upsilon_{1k}], \upsilon \in \{0, 1\}$ $Y_2=[\upsilon_{21}, \upsilon_{22}, \ldots, \upsilon_{2k}], \upsilon \in \{0, 1\}$ The XOR operation, denoted by $\otimes$, can be used to evaluate fitness (analogous to the dot product):

$\Gamma(Y_1, Y_2) = \upsilon_{11} \otimes \upsilon_{21} + \upsilon_{12} \otimes \upsilon_{22} + \ldots + \upsilon_{1k} \otimes \upsilon_{2k}$ The values produced by the fitness function are also in the domain of positive integers.

Alternative Embodiments

Within the scope of a relational database, any arbitrary data can be added to the user table. This could include physical information such as gender, race, handedness, height, weight, etc.; location information such as nationality, country, state or province, city, postal code, political district, school district, etc.; personality evaluation such as aggressiveness/passivity, extraversion/introversion, thinking/feeling, judging/perceiving, etc.

The universe of user attributes can be any subset of user information and any derivatives of such information. Attributes do not have to be single-valued but can also be tuples themselves, as long as expectations are also expressed in the same domain.

Performance measures can also assume any arbitrary values, including both single-valued and tuples. A natural extension to the example provided above would be to use a real number denoting correctness, where 0 would represent least correct and 1, most correct.

As noted above, the only restriction on expectations is that the values derived be from the same domain as user attributes. Expectations can be derived theoretical sources and also from past accumulation of user performance data. For example, it is possible to derive a set of expectations from a set of user attributes and performance data via a 3-layer back-propagation neural network.

Many obvious choices for the fitness function derive from statistical analysis. For example, a simple fitness function could measure how well the means and standard deviations match for the expectations and performance data. Another choice would be the root mean square of the differences between the two data sets.

Curriculum Assignment/Development

The following section outlines the curriculum data, assignment, learning objectives, and the logical design of a curriculum assignment and/or development component. Several sets of data, or information must converge to fully represent a curriculum in this environment. These include, without limitation, category, grade or level, age, and some form of curriculum identifier. Based on this input, when a question base is assembled to verify the student mastery of a topic there is a direct correlation between the objective and the evaluation.

The curriculum is organized as a collection of objectives that are mapped to a specific category. In addition an assignment by grade or level is also determined. When a new curriculum is being developed an initial selection for the style, or method must be made. This can take one of several forms:

Sequence

This is used when a single objective within one category is presented. An example would be teaching simple math and doing addition exclusively prior to moving on to subtraction.

Collective

In the collective style several objectives run concurrently. This would be appropriate in a review setting. Several related, and similar objectives are presented as a group. For example, addition and subtraction viewed as part of a math review curriculum.

System

In the system style a single objective is represented concurrently where categories of information are spanned to represent a complex relationship that would otherwise require a separate classification. An example of a System based curriculum would be the combinatory presentation of Social Science to include: Physical Science, Social Studies, Geography, and History for levels one, two, and three. This construct allows the entry of specifically identified category data but retrieval as a cohesive component of a larger category. In addition, there is a seamless transition between the system and sequence oriented categories as users progress between levels. This benefit is attributed to having the same structure provide the subsequent individual categories.

The category assignment is the bridge between the curriculum development/assignment component and the delivery component. A key relationship exists where category is the common axis between curriculum, content, and challenges.

When category is discussed in the context of a curriculum it is definitive.

Category "B" is assigned to science.

When category is discussed in the context of content it is collective.

Questions 1 through 20 belong to Category "B"

When category is discussed in the context of challenge it is selective.

The "Robot" game uses category "B" questions.

The Least Recently Used, LRU category is "B".

A hierarchy or sequence is applied to structure and organize information into grades and/or levels. In the curriculum development/assignment context, this is validated against user performance to standardize or weight the collected information. Age is used as a comparative reference to standardize models. This use provides both a chronological and effective age when used in comparison to others.

After amassing the user interaction data from the delivery environment, the rule base of curriculum development/assignment component is employed to validate the model, expand the question base and assign specific topics, questions and/or activities to specific users. When the analysis is completed the results are funneled back into the system to improve the effectiveness of the original configuration. A successful operation is realized when use of the system collects results of challenges and scores for content described by a curriculum. This information is then correlated and processed with the results having a direct effect on subsequent interactions. The ability to assess the assessment and dynamically interact is critical to the curriculum development/assignment component.

Figure 4:
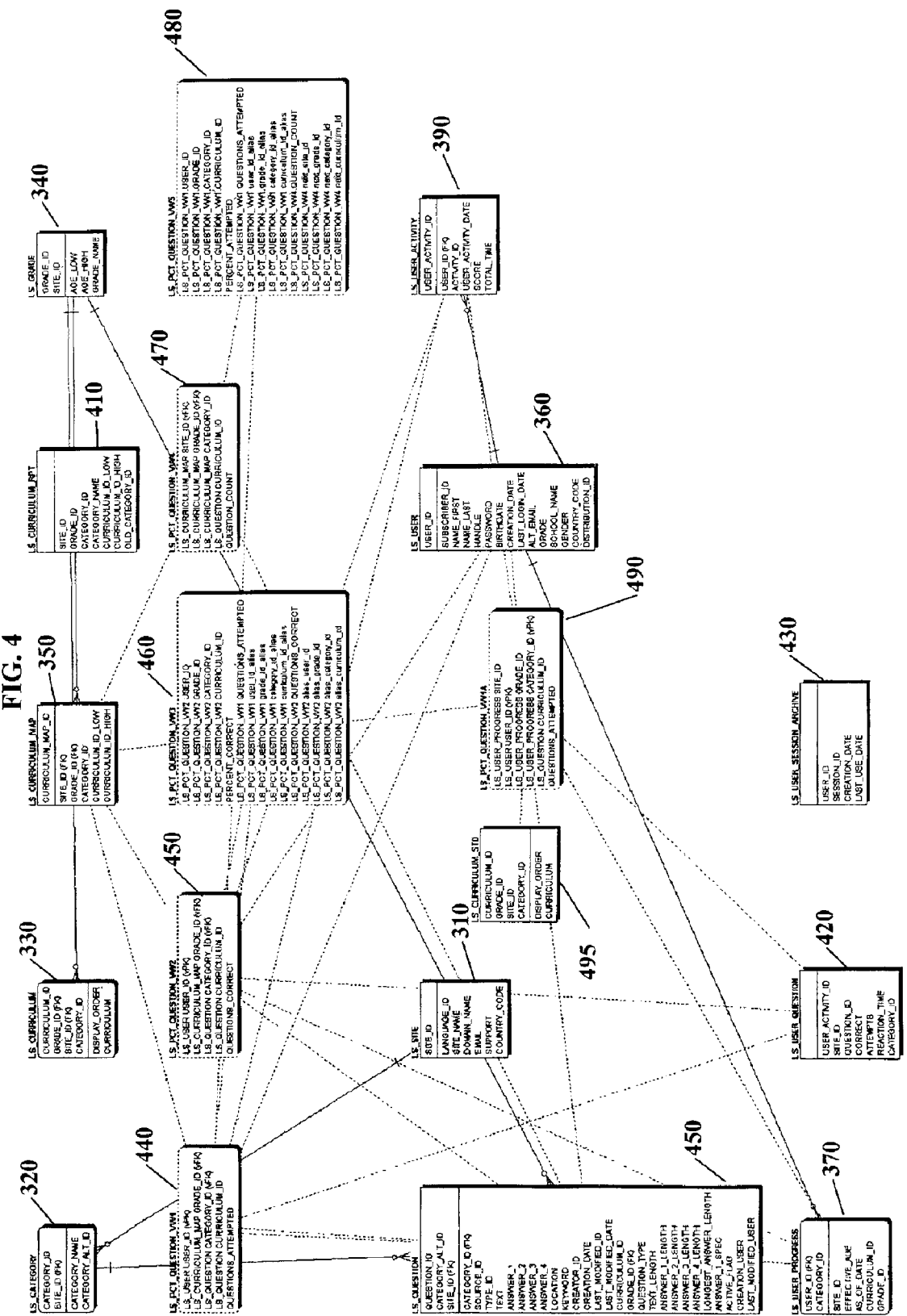
FIG. 4 is an entity relation diagram depicting key entities and relationships among them for a relational database data store used in a typical embodiment including a curriculum assignment/development component.

FIG. 4 is an entity relation diagram showing the entities and relations used in one embodiment that uses relational database architecture for supporting the curriculum development/assignment component. The architecture uses the following tables:

CATEGORY 320—Subject of study: Grammar, Science, History, and Geography.

CURRICULUM 330—Objective associated within a category.

CURRICULUM_MAP 350—Assignment (product) table for category, curriculum, and grade. Contains a record that details the valid ranges for curriculum objectives.

CURRICULUM_RPT 410—Contains curriculum objective mappings that are optimized for reporting.

CURRICULUM_STD 495—Stores the results of model computations. The table has the same keys as curriculum, but is separate because of frequent updates.

GRADE 340—Level of study appropriate for a specified age range.

SITE 310—Curriculum delivery component common table for language assignment.

USER_ACTIVITY 390—Curriculum delivery component common table for tracking user/challenge interaction.

USER_PROGRESS 370—Curriculum delivery component common table to record user milestones against curriculum USER_QUESTION 420—Curriculum delivery component common table to record user/content interaction USER_SESSION_ARCHIVE 430—Curriculum delivery component common table to record user interaction at the session level Category is a skill or subject area declaration, used as a foreign key in curriculum and question. The curriculum is a hierarchical arrangement of lessons and levels for each category of material to be tracked. This arrangement can be tailored via assignment tables that aggregate the information on a site-by-site basis. Grade is used to assign a range of ages to a particular level of study.

The curriculum map table allows the creation of system style curriculum groupings. By mapping a category across multiple curriculum id ranges consolidation or the distribution of objectives can be achieved.

A variety of different views into the data may be available as described below, included with each view is code that may be used in certain embodiment to generate these views:

PCT_QUESTION_VW1 440—Number of available questions attempted.

```
CREATE VIEW LS_PCT_QUESTION_VW1
(SITE_ID, USER_ID, GRADE_ID, CATEGORY_ID,
   CURRICULUM_ID,
QUESTIONS_ATTEMPTED, STREET1, STREET2,
   CITY, STATE, POSTAL_CODE,
COUNTRY_CODE, OBSCENITY_FILTER_MASK,
   OBSCENITY_FILTER_LIST,
RESTRICTED_ACTIVITIES_MASK, FORWARD_
   BLOCKED_EMAIL) AS
SELECT F.SITE_ID, A.USER_ID, D.GRADE_ID,
   E.CATEGORY_ID,
E.CURRICULUM_ID, COUNT(B.QUESTION_ID),
   F.STREET1, F.STREET2, F.CITY,
F.STATE, F.POSTAL_CODE, F.COUNTRY_CODE,
   F.OBSCENITY_FILTER_MASK,
F.OBSCENITY_FILTER_LIST, F.RESTRICTED_
   ACTIVITIES_MASK,
F.FORWARD_BLOCKED_EMAIL
FROM LS_USER A, LS_USER_QUESTION B,
   LS_USER_ACTIVITY C,
LS_CURRICULUM_MAP D,
LS_QUESTION E, LS_SUBSCRIBER F, LS_USER_
   PROGRESS G
WHERE A.USER_ID=C.USER_ID
AND A.USER_ID=C.USER_ID
AND G.USER_ID=C.USER_ID
AND A.SUBSCRIBER_ID=F.SUBSCRIBER_ID
AND B.USER_ACTIVITY_ID=C.USER_ACTIVITY_ID
AND B.QUESTION_ID=E.QUESTION_ID
AND D.CURRICULUM_ID_LOW<=
   E.CURRICULUM_ID
AND D.CURRICULUM_ID_HIGH>=
   E.CURRICULUM_ID
AND D.SITE_ID=F.SITE_ID
AND D.SITE_ID=E.SITE_ID
AND G.SITE_ID=D.SITE_ID
AND G.CATEGORY_ID=E.CATEGORY_ID
AND D.GRADE_ID=G.GRADE_ID
GROUP BY F.SITE_ID, A.USER_ID, D.GRADE_ID,
   E.CATEGORY_ID,
E.CURRICULUM_ID
```

PCT_QUESTION_VW1A 490—Curriculum_Std adapted number of available questions attempted.

```
CREATE VIEW ROOT.LS_PCT_QUESTION_VW1A
(
SITE_ID,
USER_ID,
GRADE_ID,
CATEGORY_ID,
CURRICULUM_ID,
QUESTIONS_ATTEMPTED
)
AS
SELECT F.SITE_ID, A.USER_ID, D.GRADE_ID,
   E.CATEGORY_ID,
E.CURRICULUM_ID, COUNT(B.QUESTION_ID)
FROM LS_USER A, LS_USER_QUESTION B,
   LS_USER_ACTIVITY C
LS_CURRICULUM_MAP D,
LS_QUESTION E, LS_SUBSCRIBER F, LS_USER_
   PROGRESS G, LS_CURRICULUM_STD
   H
WHERE A.USER_ID=C.USER_ID
AND A.USER_ID=C.USER_ID
AND G.USER_ID=C.USER_ID
AND A.SUBSCRIBER_ID=F.SUBSCRIBER_ID
AND B.USER_ACTIVITY_ID=C.USER_ACTIVITY_ID
AND B.QUESTION_ID=E.QUESTION_ID
AND D.CURRICULUM_ID_LOW<=E.CURRICULUM_
   ID
AND D.CURRICULUM_ID_HIGH>=
   E.CURRICULUM_ID
AND D.SITE_ID=F.SITE_ID
AND D.SITE_ID=E.SITE_ID
AND G.SITE_ID=D.SITE_ID
AND G.CATEGORY_ID=E.CATEGORY_ID
AND D.GRADE_ID=G.GRADE_ID
AND D.CURRICULUM_ID_LOW<=H.CURRICULUM_
   ID
AND D.CURRICULUM_ID HIGH>=
   H.CURRICULUM_ID
AND H.SITE_ID=D.SITE_ID
AND H.CATEGORY_ID=G.CATEGORY_ID
AND H.GRADE_ID =G.GRADE_ID
AND H.OBSERVED_GENDER_BIAS>0
GROUP BY F.SITE_ID, A.USER_ID, D.GRADE_ID,
   E.CATEGORY_ID,
E.CURRICULUM_ID
```

PCT_QUESTION_VW2 450—Number of available questions answered correctly.

```
CREATE VIEW LS_PCT_QUESTION_VW2
(SITE_ID, USER_ID, GRADE_ID, CATEGORY_ID,
   CURRICULUM_ID,
QUESTIONS_CORRECT, STREET1, STREET2, CITY,
   STATE, POSTAL_CODE,
COUNTRY_CODE, OBSCENITY_FILTER_MASK,
   OBSCENITY_FILTER_LIST,
RESTRICTED_ACTIVITIES_MASK, FORWARD_
   BLOCKED_EMAIL) AS
SELECT F.SITE_ID, A.USER_ID, D.GRADE_ID,
   E.CATEGORY_ID,
E.CURRICULUM_ID, COUNT(B.QUESTION_ID),
   F.STREET1, F.STREET2, F.CITY,
F.STATE, F.POSTAL_CODE, F.COUNTRY_CODE,
   F.OBSCENITY_FILTER_MASK,
F.OBSCENITY_FILTER_LIST, F.RESTRICTED_
   ACTIVITIES_MASK,
```

F.FORWARD_BLOCKED_EMAIL
FROM LS_USER A, LS_USER_QUESTION B, LS_USER_ACTIVITY_C
LS_CURRICULUM_MAP D,
LS_QUESTION E, LS_SUBSCRIBER F, LS_USER_PROGRESS G
WHERE A.USER_ID=C.USER_ID
AND A.USER_ID=C.USER_ID
AND G.USER_ID=C.USER_ID
AND A.SUBSCRIBER_ID=F.SUBSCRIBER_ID
AND B.USER_ACTIVITY_ID=C.USER_ACTIVITY_ID
AND B.QUESTION_ID=E.QUESTION_ID
AND D.CURRICULUM_ID LOW<=E.CURRICULUM_ID
AND D.CURRICULUM_ID HIGH>=E.CURRICULUM_ID
AND D.SITE_ID=F.SITE_ID
AND D.SITE_ID=E.SITE_ID
AND G.SITE_ID=D.SITE_ID
AND G.CATEGORY_ID=E.CATEGORY_ID
AND D.GRADE_ID=G.GRADE_ID
AND B.CORRECT='Y'
AND B.ATTEMPTS=1
GROUP BY F.SITE_ID, A.USER_ID, D.GRADE_ID, E.CATEGORY_ID,
E.CURRICULUM_ID
  PCT_QUESTION_VW3 460—Percentage of attempted questions answered correctly.
CREATE VIEW LS_PCT_QUESTION_VW3
(SITE_ID, USER_ID, GRADE_ID, CATEGORY_ID, CURRICULUM_ID,
PERCENT_CORRECT, STREET1, STREET2, CITY, STATE, POSTAL_CODE,
COUNTRY_CODE, STREET1_NAME, STREET2_NAME, CITY_NAME, START_NAME,
POSTAL_CODE_NAME, COUNTRY_CODE_NAME, OBSCENITY_FILTER_MASK,
OBSCENITY_FILTER_LIST, RESTRICTED_ACTIVITIES_MASK,
FORWARD_BLOCKED_EMAIL, OBS_FILTER_MASK, OBS_FILTER_LIST,
REST_ACTIVITIES_MASK, FWD_BLOCKED_EMAIL) AS
SELECT A.SITE_ID, A.USER_ID, A.GRADE_ID, A.CATEGORY_ID, A.CURRICULUM_ID,
((A.QUESTIONS_CORRECT/B.QUESTIONS_ATTEMPTED)*100), B.STREET1,
B.STREET2, B.CITY, B.STATE, B.POSTAL_CODE, B.COUNTRY_CODE, A.STREET1
STREET1_NAME, A.STREET2 STREET2_NAME, A.CITY CITY_NAME, A.STATE
START_NAME, A.POSTAL_CODE POSTAL_CODE_NAME, A.COUNTRY_CODE
COUNTRY_CODE_NAME, B.OBSCENITY_FILTER_MASK, B.OBSCENITY_FILTER_LIST,
B.RESTRICTED_ACTIVITIES_MASK, B.FORWARD_BLOCKED_EMAIL,
A.OBSCENITY_FILTER_MASK OBS_FILTER_MASK, A.OBSCENITY_FILTER_LIST
OBS_FILTER_LIST, A.RESTRICTED_ACTIVITIES_MASK REST_ACTIVITIES_MASK,
A.FORWARD_BLOCKED_EMAIL FWD_BLOCKED_EMAIL
FROM LS_PCT_QUESTION_VW2 A, LS_PCT_QUESTION_VW1 B
WHERE A.SITE_ID=B.SITE_ID
AND A.USER_ID=B.USER_ID
AND A.GRADE_ID=B.GRADE_ID
AND A.CATEGORY_ID=B.CATEGORY_ID
AND A.CURRICULUM_ID=B.CURRICULUM_ID
  PCT_QUESTION_VW4 470—Total number of available questions.
CREATE VIEW ROOT.LS_PCT_QUESTION_VW4
(SITE_ID, GRADE_ID, CATEGORY_ID, CURRICULUM_ID, QUESTION_COUNT) AS
SELECT A.SITE_ID, A.GRADE_ID, A.CATEGORY_ID, B.CURRICULUM_ID,
COUNT(B.QUESTION_ID)
FROM LS_CURRICULUM_MAP A, LS_QUESTION B
WHERE A.SITE_ID=B.SITE_ID
AND A.CURRICULUM_ID_LOW<=B.CURRICULUM_ID
AND A.CURRICULUM_ID_HIGH>=B.CURRICULUM_ID
GROUP BY A.SITE_ID, A.GRADE_ID, A.CATEGORY_ID, B.CURRICULUM_ID
  PCT_QUESTION_VW5 480—Percentage of available questions answered correctly.
CREATE VIEW LS_PCT_QUESTION VW5
(SITE_ID, USER_ID, GRADE_ID, CATEGORY_ID, CURRICULUM_ID,
PERCENT_ATTEMPTED, STREET1, STREET2, CITY, STATE, POSTAL_CODE,
COUNTRY_CODE, OBSCENITY_FILTER_MASK, OBSCENITY_FILTER_LIST,
RESTRICTED_ACTIVITIES_MASK, FORWARD_BLOCKED_EMAIL) AS
SELECT B.SITE_ID, B.USER_ID, B.GRADE_ID, B.CATEGORY_ID,
B.CURRICULUM_ID,
((B.QUESTIONS_ATTEMPTED/C.QUESTION_COUNT)*100), B.STREET1,
B.STREET2, B.CITY, B.STATE, B.POSTAL_CODE, B.COUNTRY_CODE,
B.OBSCENITY_FILTER_MASK, B.OBSCENITY_FILTER_LIST,
B.RESTRICTED_ACTIVITIES_MASK, B.FORWARD_BLOCKED_EMAIL
FROM LS_PCT_QUESTION_VW1 B, LS_PCT_QUESTION_VW4 C
WHERE B.SITE_ID C.SITE_ID
AND B.GRADE_ID=C.GRADE_ID
AND B.CATEGORY_ID=C.CATEGORY_ID
AND B.CURRICULUM_ID=C.CURRICULUM_ID FIG. 7 is an exemplary process that increments the grade and effective age in the user_progress table. This is based on the results of user interaction and is simplified via the pct_question_vw1–5 views. Another variant of user promotion uses the user_session_archive table in conjuction with the pct_question_vw1–5 views to capture and promote with per session precision vs. cumulative tally.

The results from solving the model are stored in curriculum_std. This table is similar to the user_progress table in design and function. The keys for curriculum evaluation are curriculum id, site id, category id and grade id. Dependent variables are defined and programmed separately, but can draw from any user, content, or challenge measure. At present age, gender, and country are being tracked. However, any variable within curriculum environment is a candidate for scrutiny if a relationship to curriculum is demonstrated. The values contained in curriculum std are used by internal programs to adjust the selectivity of the automated functions within curriculum delivery component.

In the 1s_pct_question_vw1a view a demonstration of curriculum_std is available. In this simple use case joining the curriculum_std table to the query and specifying a relational condition (observed_gender_bias>0) eliminates curriculum id's from the count.

Throughout this application, various publications may have been referenced. The disclosures of these publications in their entireties are hereby incorporated by reference into this application in order to more fully describe the state of the art to which this invention pertains.

The embodiments described above are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A system for providing adaptive content to one or more users via one or more user computers, the system comprising:
   a) a system data store for storing data comprising:
   i) activity information associated with at least one activity;
   ii) topic information associated with at least one topic; and
   iii) question information associated with one or more questions, wherein each question is associated with at least one topic and comprises a question text, a language indicator and a plurality of possible answers, wherein the plurality of possible answers comprises at least one correct answer;
   b) a link to a communication channel allowing communication with the one or more user computers; and
   c) a system processor in communication with the system data store and the link, wherein the system processor executes one or more processes that perform tasks comprising of:
   i) determine at least one filtering constraints;
   ii) specify a set of available activities and a set of available topics based at least in part upon the determined at least one filtering constraint;
   iii) receive activity selection information indicating a selected activity, wherein the selected activity is selected form the specified set of available activities, wherein each available activity in the specified set is of a type selected from the group consisting of games and interactive stories;
   iv) receive topic selection information indicating a selected topic, wherein the selected topic is selected from the specified set of available topics;
   v) retrieve a set of questions and answers based upon a criterion selected from the group consisting of the selected topic, the selected activity, a selected filtering constraint from the determined at least one filtering constraint and combinations thereof; and
   vi) receive a request to interact from a current user using a current user computer; and
   vii) provide the current user with an opportunity to interact with activity information associated with the selected activity through the current user computer via the communication channel, wherein progression through the activity information associated with the selected activity is based upon the current user successfully answering selected questions from the set of retrieved questions and answers.

2. The system of claim 1, wherein the communication channel is selected from the group consisting of computer network, direct serial or parallel connection, dial-up connection, wireless connection, bus connection and combinations thereof.

3. The system of claim 2, wherein the communication channel is the Internet.

4. The system of claim 1, wherein the link allows selective communication between the system processor and the current user computer over the communication channel.

5. The system of claim 1, wherein the system data store has an architecture selected from the group consisting of a flat file, a hash table, a database and combinations thereof.

6. The system of claim 5, wherein the system data store comprises a database and wherein the database has an organization selected from the group consisting of hierarchical, object-oriented, relational, object-relational, spatial and combinations thereof.

7. The system of claim 1, wherein the system data store comprises a plurality of storage subsystems.

8. The system of claim 1, wherein the system data store comprises at least one data processor, wherein the at least one data processor is in communication with the system processor and receives and services data requests from the system processor.

9. The system of claim 1, wherein each of the determined at least one filtering constraint is of a type selected from the group consisting of nationality indicator, language indicator, communication channel parameter and user computer characteristic.

10. The system of claim 9, wherein the determined at least one filter constraint comprises a language indicator and wherein the system processor determines the language indicator by (a) identifying an access processing element, selected from the at least one processing element of the system processor, to which the current user has directed the received request to interact and (b) determining the language indicator based upon the identified access processing element.

11. The system of claim 9, wherein the determined at least one filter constraint comprises communication channel parameters and wherein the system processor further vii) retrieves activity information associated with the selected activity from the system data store at least in part based upon the communication channel parameters.

12. The system of claim 1, wherein the system processor comprises a plurality of processing elements, wherein each of the processing elements runs processes that perform a subset of tasks i) through vii) and wherein the union of the subsets of task performed by the processes running the processing elements in the plurality of processing elements comprises all tasks i) through vii).

13. The system of claim 12, wherein the subset of tasks performed by the processes running on each processing element is not empty.

14. The system of claim 1, wherein the system data further stores data comprising iv) user information associated with at least on user.

15. The system of claim 1, wherein the system data further stores data comprising iv) user information associated with at least one user.

16. The system of claim 15, wherein the system data store comprises the user data store.

17. The system of claim 15, wherein the system processor further viii) provides an interface to a teacher user via a teacher computer by which the teacher user may associate user specific topics selected from the specified set of available topics with a student user selected from the one or more users; ix) in response to a trigger by the teacher user indicating the entry of the user specific topics through the provided interface, receiving the user specific topics from the provided interface; and x) storing the user specific topics in user information associated with the student user in the user data store.

18. The system of claim 15, wherein the system processor further viii) stores user information associated with the current user in the user data store.

19. The system of claim 18, wherein the system processor further ix) provides an interface by which the current user may enter at least part of the user information to be stored and x) receives the information entered into the provided interface in response to a trigger event by the current user.

20. The system of claim 18, wherein the system processor determines at least one of the at least one determined filtering constraints from the stored user information.

21. The system of claim 18, wherein the stored user information comprises information associated with the current user selected from the group consisting of performance metrics associated with the current user's progression through the selected activity, the current user's age, the current user's gender, a nationality indicator based upon the current user's nationality, a language indicator based upon the current user's nationality, a language indicator based upon the current user's nationality, a language indicator based upon the current user's language, the current user's grade level, identification information associated with the current user and combinations thereof.

22. The system of claim 21, wherein the stored user information comprises performance metrics associated with the current user's progression through the selected activity, wherein the system processor further viii) collects performance metric associated with the current user's progression through the selected activity, and wherein the system processor aggregates the collected performance metrics with previously stored performance metrics in the user data store as part of storing user information associated with the current user.

23. The system of claim 22, wherein the system processor further ix) receives student identification information associated with one or more student users selected from the user data store performance metrics associated with the one or more student users based upon the received student identification information; and xi) presents the retrieved performance metrics to the teacher user via the teacher computer.

24. The system of claim 23, wherein the system processor receives student identification information by (a) receiving teacher information associated with the teacher user and (b) retrieving from the user data store the student identification information associated with the one or more students based upon the received teacher information.

25. The system of claim 1, wherein the system processor further viii) retrieves user information associated with the current user.

26. The system of claim 25, wherein the system processor retrieves user information by parsing the user information from the received request to interact.

27. The system of claim 25, wherein the system processor determines at least one of the at least one determined filtering constraints from the retrieved user information.

28. The system of claim 25, and further comprising a user data store for storing data comprising user information associated with at least one user and wherein the system processor retrieves user information by (a) receiving identification information associated with the current user and (b) requesting the user information from the data store based upon the received identification information.

29. The system of claim 28, wherein the system processor further (c) provides the current user with an interface by which the identification information may be entered and receives the identification information from the provided interface in response to a trigger by the current user indicating the entry of the identification information.

30. The system of claim 28, wherein the system processor receives the identification information by parsing the identification information from the received request to interact.

31. A system for providing adaptive content to one or more users via one or more user computers, the system comprising:
   a) storage means for storing data comprising:
      i) activity information associated with at least one activity;
      ii) topic information associated with at least one topic; and
      iii) question information associated with one or more questions, wherein each question is associated with at least one topic and comprises a question text, a language indicator and a plurality of possible answers, wherein the plurality of possible answers comprises at least one correct answer;
   the storage means comprising one or more storage processing means for receiving and servicing data requests; and
   b) one or more general processing means in communication with the storage means and the one or more user computers, the one or more general processing means for:
      i) receiving a request to interact from a current user from the one or more users using a current user computer from the one or more computers;
      ii) determining at least one filtering constraints, wherein each of the at least one determined filtering constraints is of a type selected from the group consisting of nationality indicator, language indicator, communication channel parameter and user computer characteristic;
      iii) specifying a set of available activities and a set of available topics based at least in part upon the determined at least one filtering constraint;
      iv) receiving activity selection information indicating a selected activity, wherein the selected activity is selected form the specified set of available activities, wherein each available activity in the specified set is of a type selected from the group consisting of games and interactive stories;
      v) receiving topic selection information indicating a selected topic, wherein the selected topic is selected from the specified set of available topics;
      vi) requesting from the storage means a set of questions and answers based upon a criterion selected from the group consisting of the selected topic, the selected activity, a selected filtering constraint from the determined at least one filtering constraint and combinations thereof;
      vii) receiving the requested set of questions and answers from the stsorage means;
      viii) requesting and receiving activity information associated with the selected activity from the storage means; and
      ix) providing the current user with an opportunity to interact with the received activity information through the current user computer, wherein progression through the received activity information is based upon the current user successfully answering selected questions from the set of requested questions and answers.

32. The system of claim 30, wherein the one or more general processing means comprise a subset of the one or more storage processing means.

33. The system of claim 30, wherein the one or more general processing means comprise one or more access processing means for providing at least functionality i) and ix).

34. The system of claim 33, wherein the one or more general processing means further comprise one or more logic processing means for providing at least functionality ii) through viii).

35. The system of claim 30, wherein the one or more general processing means comprise one or more logic processing means for providing at least functionality ii) through viii).

36. A computer readable storage environment storing instructions that upon execution by one or more system computers cause the one or more system computers to provide adaptive content to one or more users via one or more user computers by performing the steps of:

a) receiving a request to interact from a current user from the one or more users using a current user computer from the one or more computers;

b) determining at least one filtering constraints, wherein each of the at least one determined filtering constraints is of a type selected form the group consisting of nationality indicator, language indicator, communication channel parameter and user computer characteristic;

c) specifying a set of available activities and a set of available topics based at least in part upon the determined at least one filtering constraint;

d) receiving activity selection information indicating a selected activity, wherein the selected activity is selected from the specified set of available activities, wherein each available activity in the specified set is a type selected from the group consisting of games and interactive stories;

e) receiving topic selection information indicating a selected topic, wherein the selected topic is selected from the specified set of available topics;

f) retrieving a set of questions and answers based upon a criterion selected from the group consisting of the selected topic, the selected activity, a selected filtering constraint from the determined at least one filtering constraint and combinations thereof;

g) retrieving activity information associated with the selected activity from the storage means; and h) providing the current user with an opportunity to interact with the retrieved activity information through the current user computer, wherein progression through the retrieved activity information is based upon the current user successfully answering selected questions from the set of requested questions and answers.

37. The storage environment of claim 36, wherein the storage environment comprises at least one storage device of a type selected from the group consisting of RAM, ROM, hard disk drive, removable magnetic diskette, optical diskette and combination thereof.

* * * * *